United States Patent
Fujii et al.

(10) Patent No.: US 9,550,517 B2
(45) Date of Patent: Jan. 24, 2017

(54) REAR WHEEL STEERING APPARATUS FOR VEHICLE

(71) Applicant: AISIN SEIKI KABUSHIKI KAISHA, Kariya-shi, Aichi-ken (JP)

(72) Inventors: Shimpei Fujii, Anjo (JP); Soichiro Kono, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/855,936

(22) Filed: Sep. 16, 2015

(65) Prior Publication Data
US 2016/0083005 A1    Mar. 24, 2016

(30) Foreign Application Priority Data
Sep. 19, 2014    (JP) .................................. 2014-190682

(51) Int. Cl.
*B62D 5/04* (2006.01)
*B62D 7/14* (2006.01)
*F16H 57/08* (2006.01)

(52) U.S. Cl.
CPC ........... *B62D 5/0427* (2013.01); *B62D 5/0442* (2013.01); *B62D 7/146* (2013.01); *F16H 57/082* (2013.01)

(58) Field of Classification Search
CPC ................................................. B62D 5/0427
See application file for complete search history.

(56) References Cited

U.S. PATENT DOCUMENTS

| 2004/0057813 A1 | 3/2004 | Horng et al. |
| 2005/0143215 A1 | 6/2005 | Fugel |
| 2007/0249453 A1* | 10/2007 | Sugitani .................. B62D 3/02 475/4 |

(Continued)

FOREIGN PATENT DOCUMENTS

| EP | 1 470 348 A1 | 10/2004 |
| EP | 2 436 456 A2 | 4/2012 |

(Continued)

OTHER PUBLICATIONS

European Search Report issued Feb. 24, 2016, by the European Patent Office, in corresponding European Patent Application No. 15185400.7 (8 pages).

*Primary Examiner* — Kevin Hurley
(74) *Attorney, Agent, or Firm* — Buchanan Ingersoll & Rooney PC

(57) ABSTRACT

A rear wheel steering apparatus for a vehicle includes: a housing connected via first and second connecting members to a suspension mechanism supporting rear wheels of a vehicle; an electric motor accommodated in the housing; a planetary gear mechanism having a sun gear connected to an output shaft of the electric motor, a ring gear non-rotatably supported inside the housing, a planetary gear meshing with the ring gear and the sun gear, and a carrier connected to the planetary gear, and reducing the output of the electric motor; and a linear motion mechanism having a nut member connected to the planetary gear mechanism and forming the carrier, and a rod screwed to the nut member and connected to the second connecting member, and converting the rotational motion of the nut member into the linear motion of the rod.

5 Claims, 6 Drawing Sheets

(56) References Cited

U.S. PATENT DOCUMENTS

| | | | |
|---|---|---|---|
| 2008/0184838 A1* | 8/2008 | Hayashi | B62D 5/008 |
| | | | 74/484 R |
| 2012/0171017 A1 | 7/2012 | Norem et al. | |
| 2014/0353072 A1* | 12/2014 | Sato | B62D 7/1581 |
| | | | 180/445 |

FOREIGN PATENT DOCUMENTS

| | | |
|---|---|---|
| EP | 2 709 241 A2 | 3/2014 |
| JP | 5098242 B2 | 10/2012 |
| WO | 00/43688 A1 | 7/2000 |

* cited by examiner

REAR WHEEL STEERING APPARATUS FOR VEHICLE

CROSS REFERENCE TO RELATED APPLICATIONS

This application is based on and claims priority under 35 U.S.C. §119 to Japanese Patent Application 2014-190682, filed on Sep. 19, 2014, the entire contents of which are incorporated herein by reference.

TECHNICAL FIELD

This disclosure relates to a rear wheel steering apparatus for a vehicle that is installed in a suspension mechanism supporting rear wheels of a vehicle, and turns the rear wheels.

BACKGROUND DISCUSSION

In recent years, various forms of rear wheel steering apparatuses, each of which is a portion of a four-wheel steering (4WS) system for a vehicle, have been disclosed. As disclosed in JP 5098242 (Reference 1), the rear wheel steering apparatus is basically made up of "a rod that is connected to rear wheels of a vehicle; a housing that supports the rod, and is fixed to a chassis of the vehicle; and a motor that is accommodated in the housing, and drives the rod such that the rear wheels are turned". The apparatus is provided with a speed reduction mechanism that converts the rotational motion of the motor into the linear motion of the rod, and transmits the converted motion, and a planetary gear mechanism is used as an example of the speed reduction mechanism.

In the planetary gear mechanism disclosed in Reference 1, a metal flat head pin is used as a member that rotatably supports a planetary gear (illustrated in FIG. 2 of Reference 1). The flat head pin, a flat head part of which serves as a retainer holding the planetary gear in position in an axial direction, is commercially available; however, a general-use flat head pin for use in the rear wheel steering apparatus cannot be found, and a dedicatedly designed flat head pin is required to be prepared, thereby causing an increase in cost. A configuration, in which a locking member made of synthetic resin is joined to a tip end portion of a circular columnar metal pin for general use, is deemed as a countermeasure against this problem; however, the locking member with a simple disk shape adsorbs grease coated on the planetary gear, and co-rotates with the planetary gear. As a result, frictional heat is produced in a joint portion between the pin and the locking member, and the function of the locking member retaining the planetary gear becomes deteriorated, which is a problem.

SUMMARY

Thus, a need exists for a rear wheel steering apparatus for a vehicle which is not suspectable to the drawback mentioned above.

An aspect of this disclosure is directed to a rear wheel steering apparatus for a vehicle including: a housing that is connected via a first connecting member and a second connecting member to a suspension mechanism which supports rear wheels of a vehicle; an electric motor that is accommodated in the housing; a planetary gear mechanism that has a sun gear which is connected to an output shaft of the electric motor, a ring gear which is non-rotatably supported inside the housing, a planetary gear which meshes with the ring gear and the sun gear, and a carrier which is connected to the planetary gear, and reduces the output of the electric motor; and a linear motion mechanism that has a nut member which is connected to the planetary gear mechanism and forms the carrier, and a rod which is screwed to the nut member and is connected to the second connecting member, and converts the rotational motion of the nut member into the linear motion of the rod, in which the planetary gear mechanism includes a circular columnar pin that rotatably supports the planetary gear and is fixed to the nut member, and a locking member that is joined to a tip end portion of the pin and has at least one contact portion on a surface thereof facing the planetary gear, and in a state where the planetary gear is installed between the contact portion of the locking member and the nut member, the planetary gear is supported to be capable of rotating around the pin.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
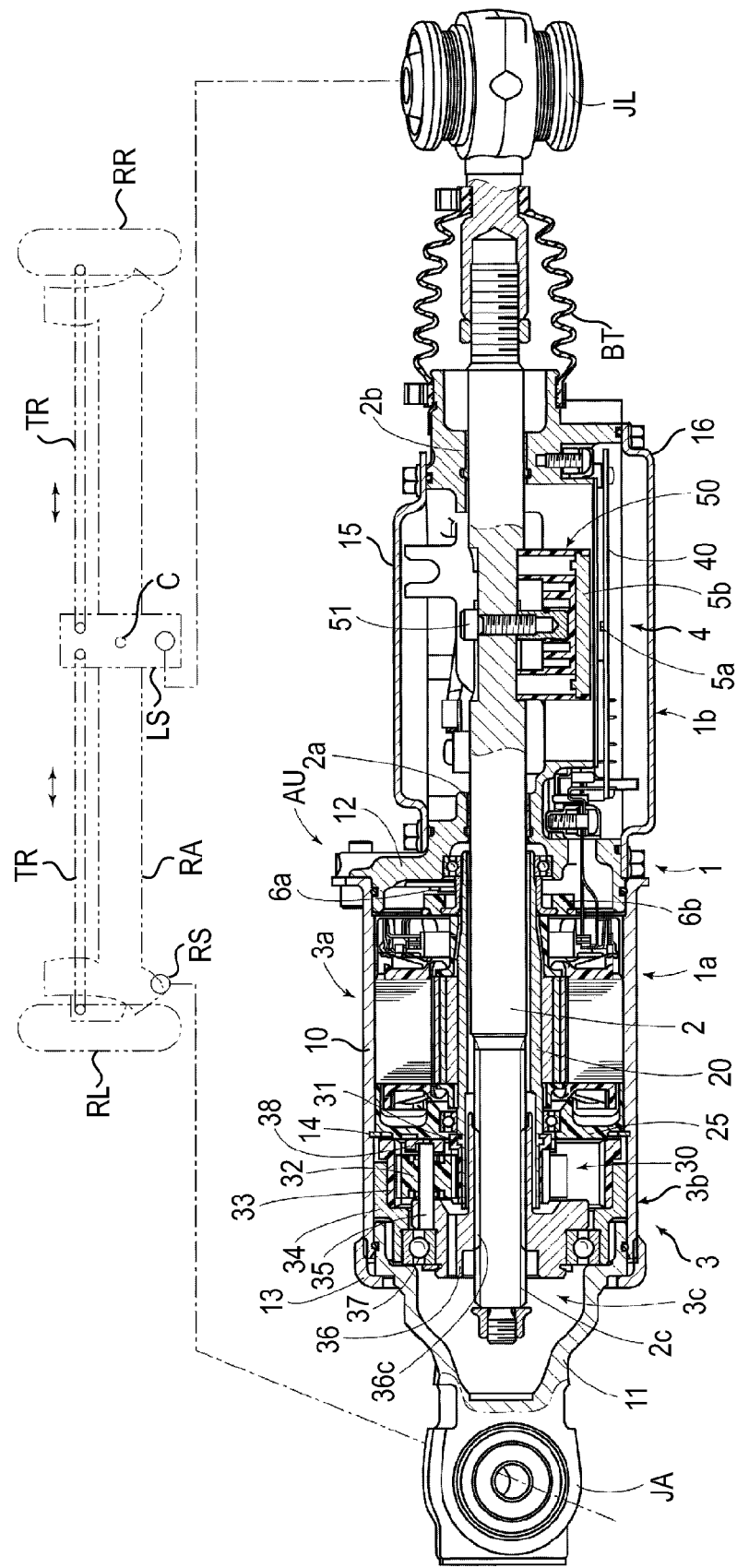
FIG. 1 is a lateral sectional view illustrating the entire configuration of a rear wheel steering apparatus in an embodiment disclosed here.

Hereinafter, a preferred embodiment disclosed here will be described with reference to the accompanying drawings. FIG. 1 illustrates the entire configuration of a rear wheel steering apparatus in an embodiment disclosed here. The rear wheel steering apparatus disclosed here is a portion of a four-wheel steering (4WS) system, and a front wheel steering apparatus is the same as one in the related art, and thus a description thereof will be omitted. There are various forms of suspension mechanisms, each of which supports rear wheels of a vehicle, and in the embodiment, the suspension mechanism is configured as illustrated by the alternate one long and two short dashes line in FIG. 1. An actuator unit AU of the rear wheel steering apparatus in the embodiment is installed between a support portion RS for a rear axle RA, which supports rear wheels RL and RR of the vehicle, and a link LS that is supported by the rear axle RA and swings around a swing center C, a section between the support portion RS and the link LS is driven to extend and contract by the actuator unit AU, and thus the rear wheels RL and RR are turned via tie rods TR, TR according to the swinging of the link LS.

According to the configuration of the actuator unit AU, a rod 2 is supported by a housing 1 so as to move (move linearly) in an axial direction, one end portion of the rod 2 is connected to the link LS via a ball joint JL, the housing 1 is connected to the support portion RS via a ball joint JA, and the rod 2 is driven by an actuator 3 such that the section between the support portion RS and the link LS of the rear axle RA is driven to extend and contract. Specifically, a controller 4 controls an electric motor 3a of the actuator 3 such that the rotation output of the electric motor 3a is reduced by a speed reduction mechanism 3b, and then is converted into the linear motion of the rod 2 via a linear motion mechanism 3c. In the embodiment, the electric motor 3a is a brushless motor.

In the embodiment, the housing 1 is broadly divided into a housing 1a into which the configuration components (the electric motor 3a and the like) of the actuator 3 are mainly built, and a housing 1b into which the configuration components (an electronic circuit board 40 and the like) of the controller 4 are mainly built. A connecting cover 11 is joined to a cylindrical body 10 of the housing 1a, a case 12 (which has top and bottom openings and openings in the axial direction) of the housing 1b is joined to the cylindrical body 10, and covers 15 and 16 are joined to the top and bottom openings of the case 12. In the embodiment, the housing 1 is made of metal, the connecting cover 11 and the case 12 are made of aluminum, and the cylindrical body 10 and the covers 15 and 16 are made of steel.

Figure 2:
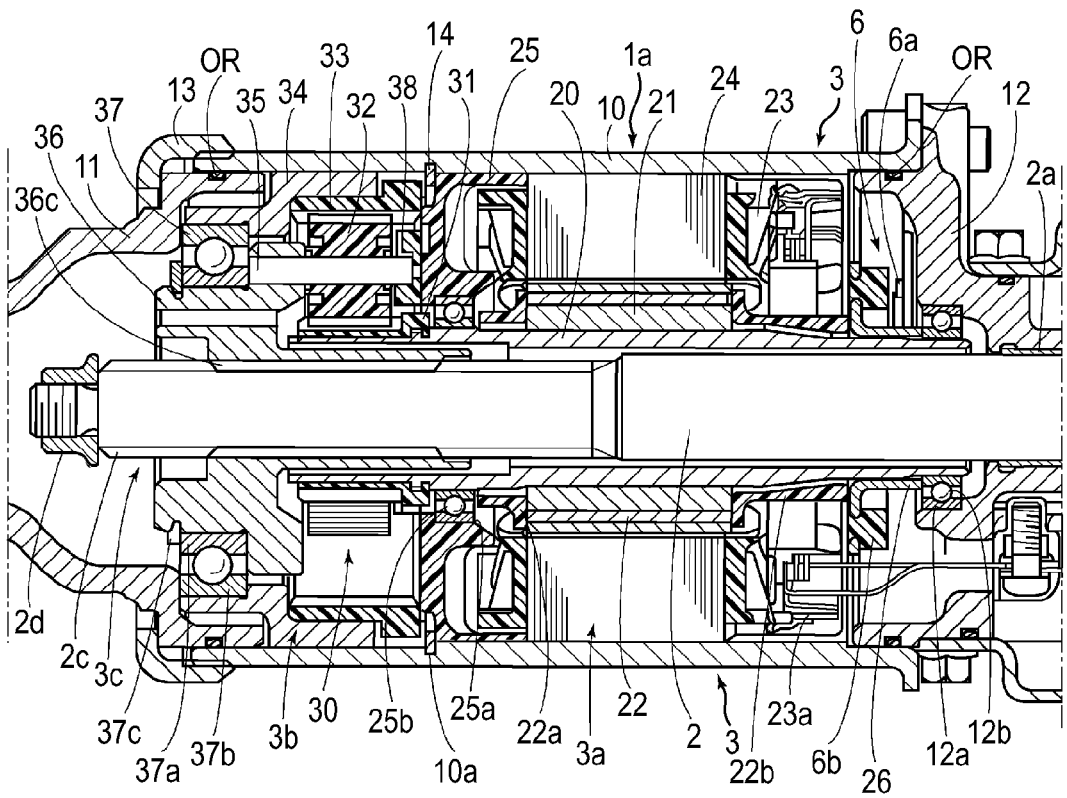
FIG. 2 is an enlarged lateral sectional view illustrating an actuator part in the embodiment disclosed here.

The actuator 3 is configured as illustrated in an enlarged form in FIG. 2, and is press-fitted into and fixed to the cylindrical body 10 with a coil 23 is wrapped around a stator 24. An output shaft of the electric motor 3a is a hollow rotational shaft 20, and the hollow rotational shaft 20 is rotatably supported via bearings 25b and 12b by an annular groove 12a provided in the case 12, and an inner diameter portion 25a of an annular motor cover 25 inserted into the cylindrical body 10. A core 21 of a rotor of the electric motor 3a is press-fitted onto and fixed to an axial intermediate portion of the hollow rotational shaft 20, and permanent magnets 22 are provided in the core 21 while being equally spaced in a circumferential direction.

The rod 2 is coaxially disposed in the hollow rotational shaft 20, and is supported in such a way that the rod 2 is capable of moving (linearly moving) relative to the housing 1 in the axial direction, and not rotating relative to the housing 1. The structure of support will be described later. Bushes 2a and 2b are installed between the rod 2 and a support portion of the case 12, and reduce slide resistance such that the rod 2 smoothly moves in the axial direction. That is, in the embodiment, the rod 2 is a so-called extension and contraction mechanism, one side of which is supported, and thus the bushes 2a and 2b are not required to serve as bearings in an axial movement mechanism, both ends of which are supported.

The speed reduction mechanism 3b in the embodiment is a planetary gear mechanism 30, and as illustrated in FIG. 2, a sun gear 31, an external toothed gear, is integrally joined to the hollow rotational shaft 20, and is supported in such a way as to be capable of rotating with the hollow rotational shaft 20. A ring gear 33, an internal toothed gear, is fixed to a holder 34 of a tubular holding member, and planetary gears 32, external toothed gears, are provided in such a way as to rotate around the sun gear 31 while meshing with the sun gear 31 and the ring gear 33. A nut member 36 is a carrier that rotatably supports the planetary gears 32 via pins 35, and the holder 34 rotatably supports the nut member 36 via a bearing 37. The bearing 37 is a ball bearing, an inner race 37a of the bearing 37 is fitted to the nut member 36, an outer race 37b of the bearing 37 is fitted to the holder 34, and the nut member 36 holds the bearing 37 by means of a C-shaped spacer 37c.

Figure 5:
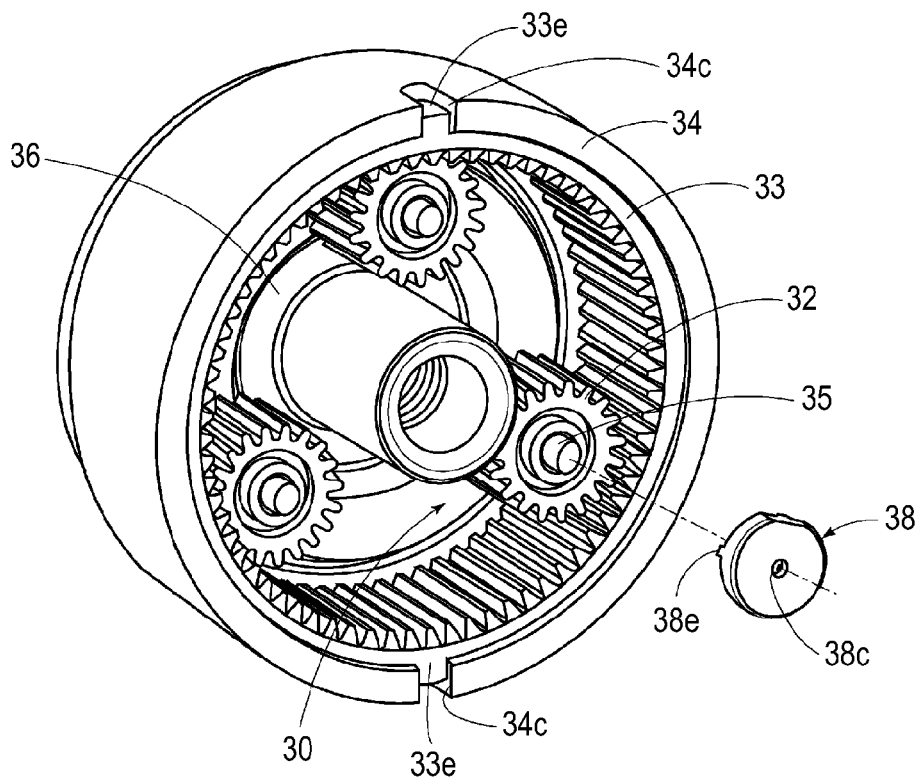
FIG. 5 is a perspective view illustrating a portion of a speed reduction mechanism in the embodiment disclosed here.
Figure 6:
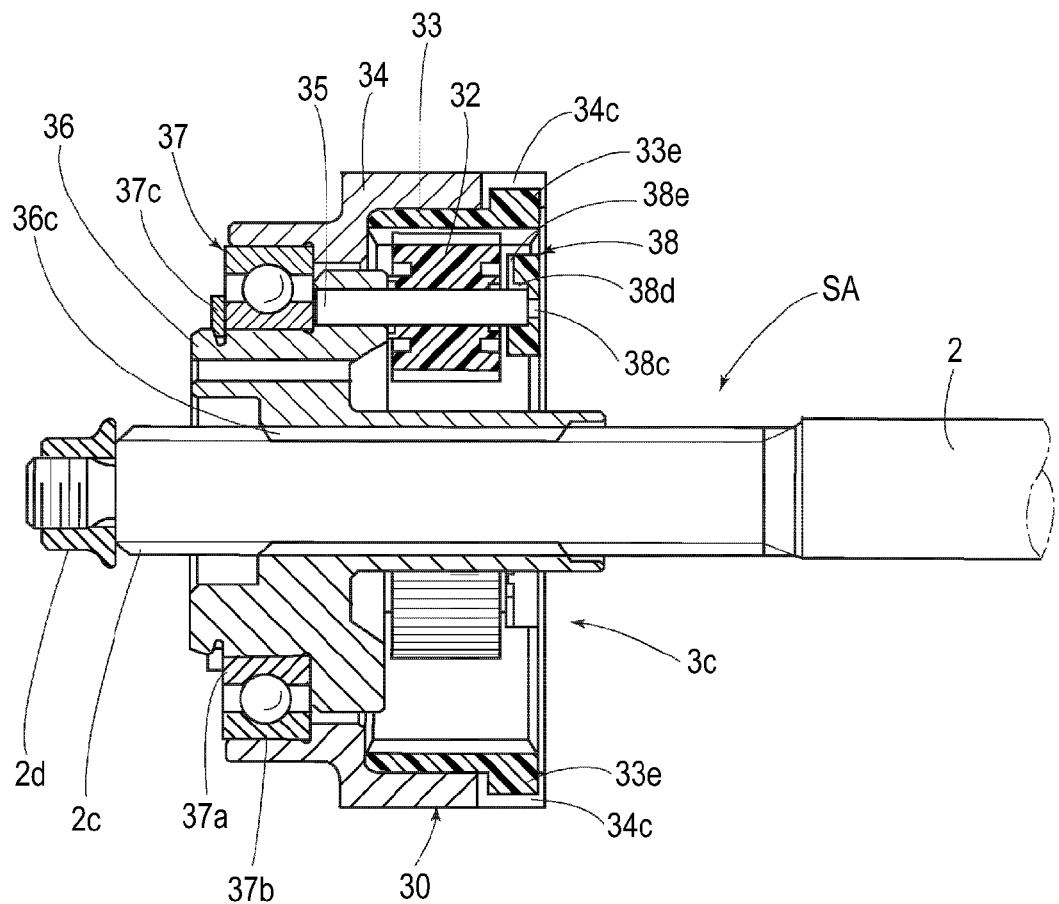
FIG. 6 is a longitudinal sectional view of a sub-assembly which is a portion of an actuator in the embodiment disclosed here.
Figure 7:
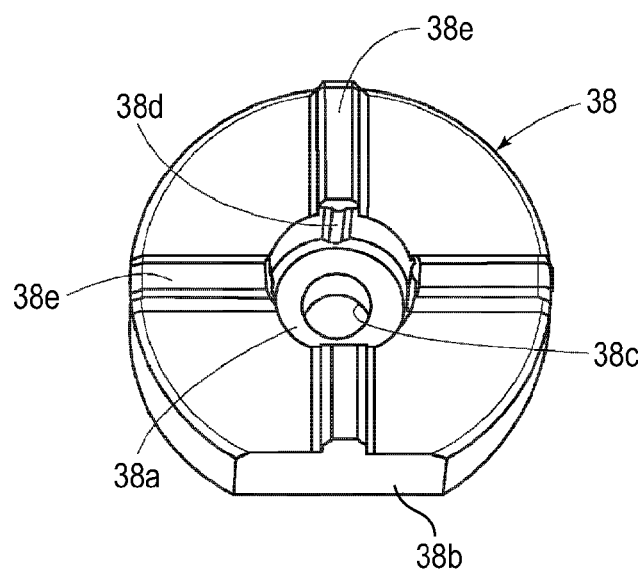
FIG. 7 is a perspective view illustrating a locking member in the embodiment disclosed here.
Figure 8:
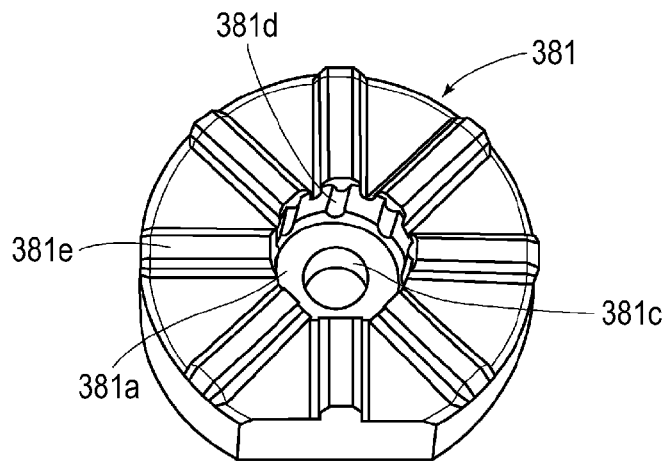
FIG. 8 is a perspective view illustrating another form of the locking member in the embodiment here.
Figure 9:
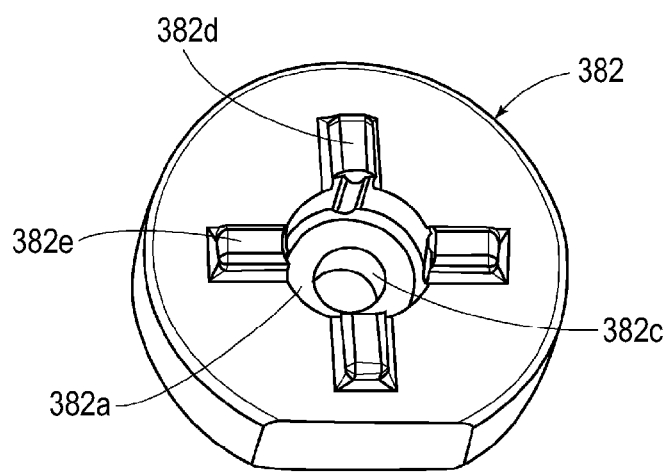
FIG. 9 is a perspective view illustrating still another form of the locking member in the embodiment here.

The pin 35 is a circular columnar metal member that rotatably supports the planetary gear 32, and a locking member 38 is joined to a tip end portion of the pin 35. As illustrated in FIGS. 5 to 7, the locking member 38 in the embodiment is made of synthetic resin, and is made into the shape of a substantially disk, and a concave portion 38a is formed in a center portion of the locking member 38. As illustrated in FIG. 7, the locking member 38 is provided with a cut-away portion 38b that is acquired by cutting away a side surface of the locking member 38, and since the cut-away portion 38b is provided as a gate for resin molding, the cut-away portion 38b is not necessarily provided. The locking member 38 has a through hole 38c that has a diameter smaller than the inner diameter of the concave portion 38a, and passes through a bottom surface of the concave portion 38a. Multiple protruding ridges (representatively denoted by a reference numeral 38d) are provided while being equally spaced along a circumference around the pin 35, extend in an axial direction of the pin 35, and protrude in a direction toward the axis. In the embodiment, four protruding ridges 38d are provided while being equally spaced in a circumferential direction. Accordingly, when the pin 35 is supported by the concave portion 38a, the pin 35 is press-fitted into the concave portion 38a while the four protruding ridges 38d are pressed to an inner surface of the concave portion 38a.

At least one contact portion (representatively denoted by a reference numeral 38e) is provided on a surface of the locking member 38 which faces the planetary gear 32, and as illustrated in FIG. 7, four contact portions 38e are radially provided around the concave portion 38a (the pin 35) while being equally spaced along a circumference around the concave portion 38a (or the pin 35). The protruding ridge 38d is provided on an end surface of the contact portion 38e, with the end surface facing the concave portion 38a, and extends in the axial direction of the concave portion 38a (the pin 35) while being integrated with an inside portion of the concave portion 38a. As illustrated in FIG. 6, while being installed between the contact portions 38e of the locking member 38 and the nut member 36, the planetary gear 32 is supported in such a way as to be capable of rotating around the pin 35.

Only the contact portions 38e of the locking member 38 can be in contact with the planetary gear 32 such that a contact area between both the locking member 38 and the planetary gear 32 is considerably reduced, and thus the co-rotation of the locking member 38 can be prevented, the planetary gear 32 can be properly supported, and a state of support can be reliably maintained. Since the pin 35 is a general-use pin, and the locking member 38 can be easily made of synthetic resin, cost can be reduced compared to the configuration in the related art. When the locking member 38 is locked to the pin 35, the pin 35 is press-fitted into the concave portion 38a of the locking member 38, and the multiple protruding ridges 38d equally apply press force to the pin 35, and thus the locking member 38 is capable of properly support the pin 35. In addition, since the through hole 38c is provided in the locking member 38, when the pin 35 is press-fitted into the concave portion 38a of the locking member 38, the space between both the locking member 38 and the pin 35 communicates with the outside via the through hole 38c, air in the space is not compressed. As a result, the locking member 38 is capable of being easily locked to the pin 35.

FIGS. 8 to 11 illustrate various forms of the locking members, and the locking members and the corresponding portions thereof are denoted by three-digit reference numerals which are acquired by adding one-digit numeral to the reference numerals of the locking member 38 and the portions thereof illustrated in FIG. 7. First, in a locking member 381 illustrated in FIG. 8, eight contact portions 381e are radially provided around a concave portion 381a (the pin 35) while being equally spaced along a circumference around the concave portion 381a (or the pin 35). While being equally spaced along the circumference around the pin 35, eight protruding ridges (representatively denoted by a reference numeral 381d) are provided on an inner circumferential surface of the concave portion 381a, extend in the axial direction of the pin 35, and protrude in the direction toward the axis. In a locking member 382 illustrated in FIG. 9, four contact portions 382e are radially provided around a concave portion 382a (the pin 35) while being equally spaced along a circumference around the concave portion 382a (or the pin 35); however, the contact portions 382e do not extend up to an outer circumferential edge of the locking member 382, and end in an intermediate portion of the locking member 382 in a radial direction.

Figure 10:
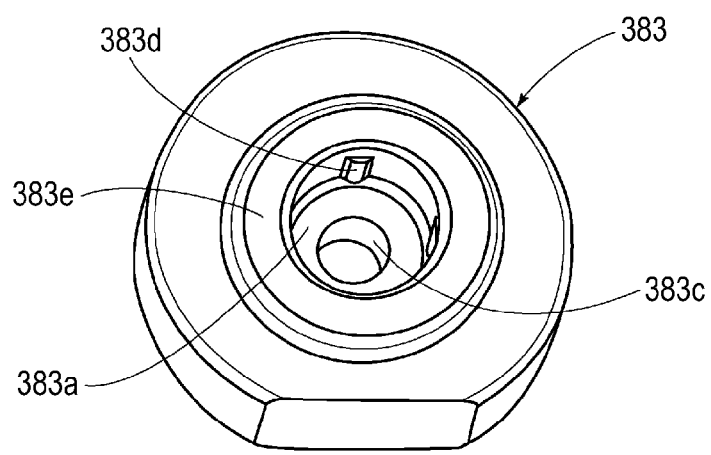
FIG. 10 is a perspective view illustrating still another form of the locking member in the embodiment here.
Figure 11:
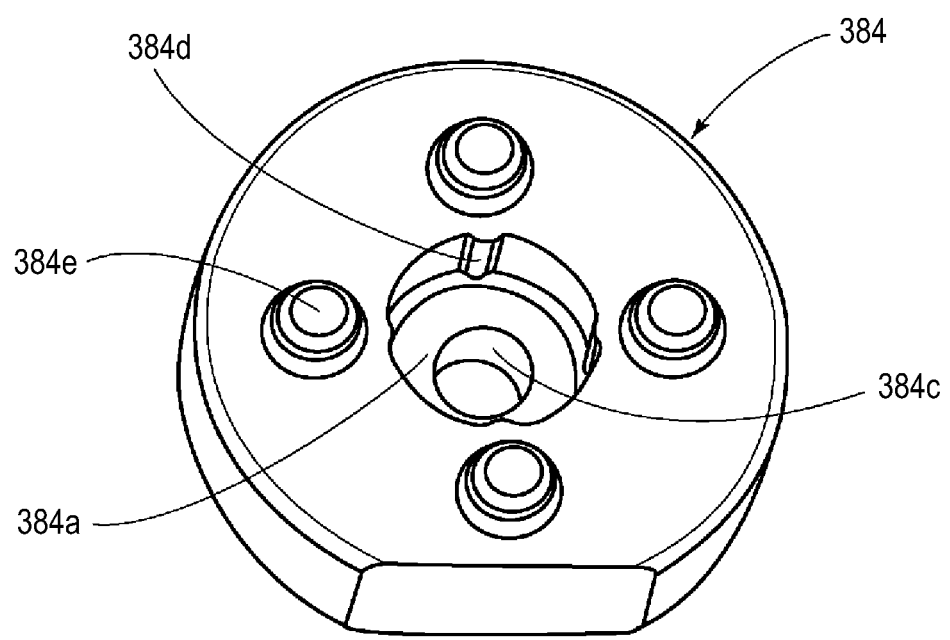
FIG. 11 is a perspective view illustrating still another form of the locking member in the embodiment here.

A locking member 383 illustrated in FIG. 10 includes an annular contact portion 383e that is provided around a concave portion 383a (or the pin 35). In a locking member 384 illustrated in FIG. 11, the contact portions are formed of multiple protrusions (representatively denoted by a reference numeral 384e) which are provided in a protruding manner while being equally spaced along a circumference around a concave portion 384a (or the pin 35). In the embodiment, four protrusions 384e are provided while being equally spaced in a circumferential direction. Naturally, the contact portion 383e and the protrusions 384e are provided independent of protruding ridges 383d and 384d. As such, the contact portions 38e and 381e to 384e can be properly set corresponding to a state of contact between the planetary gear 32 and the contact portions 38e and 381e to 384e.

In the embodiment, the holder 34 and the pin 35 are made of metal (for example, steel), the sun gear 31, the planetary gear 32, the ring gear 33, and the locking member 38 are made of synthetic resin, and the sun gear 31 is formed integrally with the hollow rotational shaft 20 made of metal. The ring gear 33 is non-rotatably supported by the holder 34, and the holder 34 is non-rotatably supported by the cylindrical body 10. That is, as illustrated in FIG. 2, a snap ring 14 is held in an annular groove 10a that is provided on the inside of the cylindrical body 10, and while the outer race 37b of the bearing 37 and the holder 34 are interposed between an annular side surface of the snap ring 14 and an annular opening end surface of the connecting cover 11, an annular lock nut 13 is screwed to a screw portion that is provided at an opening end (which is positioned close to the speed reduction mechanism 3b) (on a left side in FIG. 2) of the cylindrical body 10, and thus the cylindrical body 10 and the connecting cover 11 are tightened together. The outer race 37b of the bearing 37 and the holder 34 are strongly interposed between the snap ring 14 and the connecting cover 11 due to an axial press force produced by the screwing of the lock nut 13, and as a result, the holder 34 is non-rotatably held by the cylindrical body 10. Instead of the annular groove 10a and the snap ring 14, an annular step (not illustrated) may be provided on an inner circumferential surface of the cylindrical body 10, and the annular step may serve as a locking portion.

A male screw portion 2c on which a trapezoid thread is formed on an outer circumferential surface of one end portion of the rod 2 over a predetermined axial length and a female screw portion 36c formed on an inner circumferential surface of the nut member 36 are disposed to be screwed to each other, and the nut member 36 and the rod 2 constitute the linear motion mechanism 3c. A nut 2d for preventing the falling off of the rod 2 is screwed to a tip end of the male screw portion 2c. Since the rod 2 is supported as described above, an axial load applicable to the rod 2 is absorbed by the cylindrical body 10 and the connecting cover 11 via the nut member 36, the bearing 37, the holder 34, and the snap ring 14.

Figure 3:
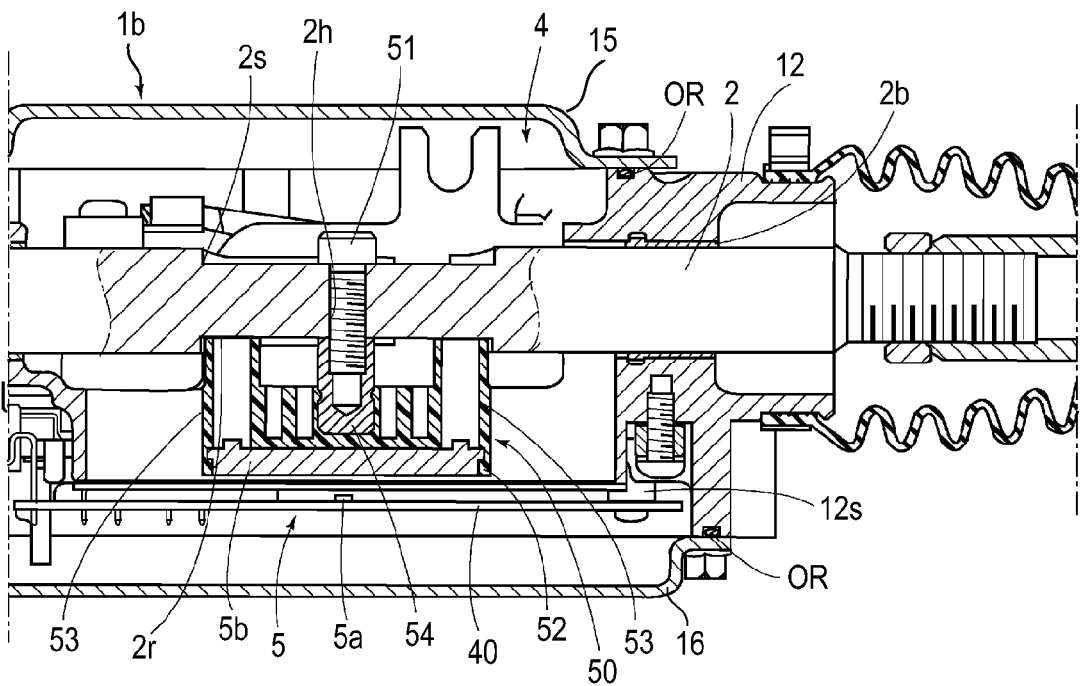
FIG. 3 is an enlarged lateral sectional view illustrating a controller part in the embodiment disclosed here.

In contrast, as illustrated in FIG. 3, the housing 1b accommodates the electronic circuit board 40 of an electronic control device (not illustrated) as the controller 4, and a magnetic block 50 of a displacement detection device 5. The displacement detection device 5 includes a displacement sensor 5a that is a magnetic vector sensor, and a permanent magnet 5b that is a neodymium magnet. The displacement sensor 5a is supported by the electronic circuit board 40, and the permanent magnet 5b is held inside the magnetic block 50. The magnetic block 50 has a function of detecting the axial displacement of the rod 2 in a linear motion, and a function of preventing the rotation of the rod 2.

Figure 4:
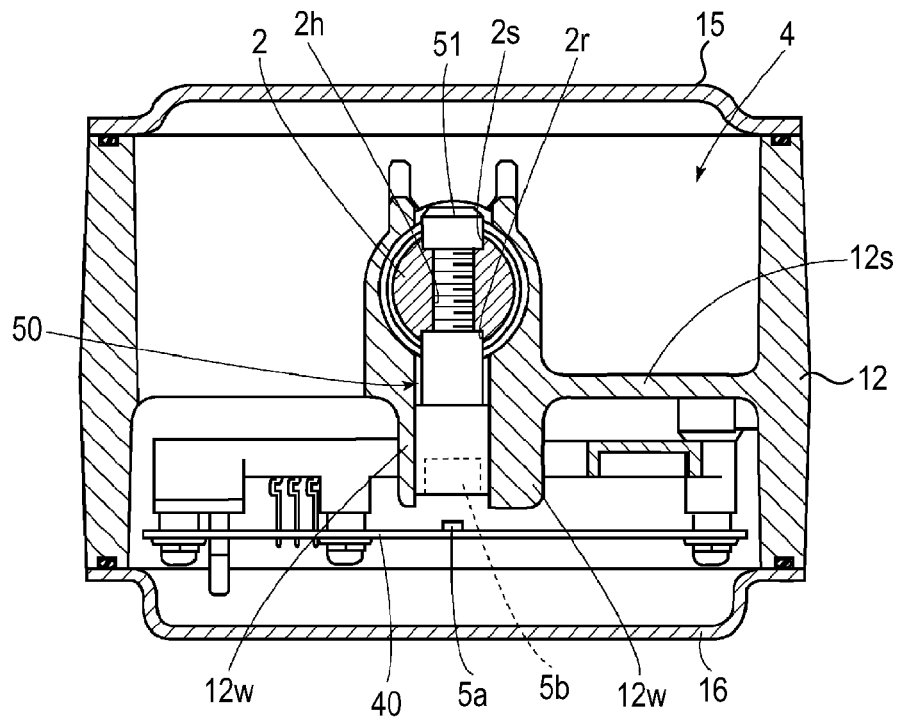
FIG. 4 is an enlarged longitudinal sectional view illustrating the controller part in the embodiment disclosed here.

As illustrated in FIGS. 3 and 4, long grooves (concave portions with substantially rectangular shape) 2r and 2s are provided on both side surfaces of the rod 2, and are lengthy in the axial direction. The magnetic block 50 is disposed on the long groove 2r, and a bolt 51 is inserted through the rod 2 from the opposite long groove 2s, and is fixed to the rod 2. The magnetic block 50 is made of synthetic resin, and, as illustrated in FIG. 3, is provided with a holding portion 52 accommodating the permanent magnet 5b, and a pair of leg portions 53, 53 extending at both ends of the holding portion 52, and a metal nut 54 is insert-molded between both the leg portions 53, 53. In contrast, as illustrated in FIG. 4, inside the case 12, a support portion 12s is provided, and a pair of erect wall portions 12w, 12w is provided in parallel with the axis of the rod 2. The holding portion 52 is assembled in such a way as to be held between the pair of erect wall portions 12w, 12w, and the bolt 51 is inserted through a through hole 2h of the rod 2, and is screwed into the nut 54. As a result, the rod 2 is non-rotatably supported by the erect wall portions 12w, 12w of the case 12, or the housing 1 via the magnetic block 50.

In the actuator 3 in the embodiment, when the hollow rotational shaft 20 is driven to rotate by the electric motor 3a, the rotation output is reduced by the speed reduction mechanism 3b of the planetary gear mechanism 30, the nut member 36 is driven to rotate, and then the rotational motion of the nut member 36 is converted into the linear motion of the rod 2 via the linear motion mechanism 3c. Accordingly, as described above, the section between the support portion RS and the ring RL of the rear axle RA extends and contracts such that the steering angle of the rear wheels is adjusted.

Hereinafter, a support structure of the holder 34 for supporting the ring gear 33 will be described. First, as illustrated in FIG. 5, the holder 34 is made in the shape of a stepped circular cylinder, and cut-away grooves 34c, 34c are provided in a side wall (circumferential wall) of the holder 34, and open in the axial direction and to inner and outer circumferential surfaces of the holder 34. In contrast, the ring gear 33 is configured as illustrated in FIG. 5, and the ring gear 33 is fitted to the holder 34, and becomes integrated therewith. In the embodiment, a pair of locking portions 33e, 33e are integrally provided in the ring gear 33 in such a way as to face each other in the radial direction, and to extend outwards in the radial direction. Each of the locking portions 33e, 33e has a radial length (height) and an axial length which are set to be smaller than those of each of the grooves 34c, 34c of the holder 34.

The ring gear 33 is held by the holder 34 in a state where a radial end surface and an axial end surface of the ring gear 33 are respectively positioned inside those of the holder 34. The planetary gear 32 and the nut member 36 are assembled, and as illustrated in FIG. 5, the locking member 38 is locked to the pin 35. Only one of the locking members 38 is representatively illustrated in FIG. 5, and a total of three locking members 38 are respectively locked to the pins 35.

Hereinafter, a method of manufacturing the actuator unit AU with the aforementioned configuration will be described. First, the stator 24 having the coil 23 wrapped therearound is press-fitted into the cylindrical body 10 by means of a press-fit apparatus (not illustrated), and is fixed at a predetermined position illustrated in FIG. 2. The motor cover 25 is inserted into the cylindrical body 10, and the snap ring 14 is fixed to the annular groove 10a on the inside of the cylindrical body 10. Separately, the bearing 25b is press-fitted to the hollow rotational shaft 20 with the integrally molded sun gear 31, and then a press member 22a made of resin for holding the permanent magnet 22 is press-fitted, and the core 21 is press-fitted and fixed. The permanent magnet 22 is magnetized in the state of a sub-assembly in which the permanent magnet 22 is accommodate inside the core 21, and a press member 22b is press-fitted.

Subsequently, the hollow rotational shaft 20 is inserted into a hollow portion of the stator 24, and the bearing 25b is held while being fitted to a hollow portion of the motor cover 25. After a support member 26 is press-fitted to an end portion of the hollow rotational shaft 20, with a plastic magnet 6b for a magnetic pole sensor 6 being fixedly attached to the support member 26, and the plastic magnet 6b is magnetized, the case 12 is joined to an opening (which is positioned close to the electric motor 3a) (on a right side in FIG. 2) of the cylindrical body 10, and the case 12 and the cylindrical body 10 are coupled together using bolts. An outer race of the bearing 12b is press-fitted into the annular groove 12a of the case 12, and when the case 12 is joined to the cylindrical body 10, an inner race of the bearing 12b is fitted to the hollow rotational shaft 20.

In contrast, the inner race 37a of the bearing 37 is fitted to the nut member 36, and is held by the spacer 37c, and the outer race 37b of the bearing 37 is fitted to the holder 34. Subsequently, the ring gear 33 is mounted on the holder 34, and when the planetary gears 32 are supported by the nut member 36 via the pins 35, a state illustrated in FIG. 5 is obtained, and the locking members 38 are press-fitted to and locked to the pins 35, respectively. The male screw portion 2c of the rod 2 is screwed to the female screw portion 36c of the nut member 36, the nut 2d is screwed to a tip end of the male screw portion 2c, and as a result, a sub-assembly SA illustrated in FIG. 6 is obtained.

The sub-assembly SA is assembled such that the rod 2 of the sub-assembly SA is inserted into the hollow rotational shaft 20 illustrated in FIGS. 1 to 3, and the sun gear 31 meshes with the planetary gear 32 and the ring gears 33, and is pressed inwards until an axial end surface of the holder 34 comes into contact with a side end surface of the snap ring 14. Subsequently, the connecting cover 11 is mounted, and the lock nut 13 is screwed to the cylindrical body 10. Accordingly, the outer race 37b of the bearing 37 and the holder 34 are strongly interposed between the snap ring 14 and the connecting cover 11. At this time, the rod 2 of the sub-assembly SA is inserted into the bushes 2a and 2b which are provided in the case 12, and extends to the outside of the case 12.

Assembling is performed such that in the case 12, the magnetic block 50 is disposed in the long groove 2r of the rod 2, and the holding portion 52 is held between the erect wall portions 12w, 12w. When the bolt 51 is inserted into the through hole 2h of the rod 2, and is screwed into the nut 54, the rod 2 is non-rotatably supported by the housing 1.

The electronic circuit board 40 having the displacement sensor 5a mounted thereon is accommodated inside the case 12, and the displacement sensor 5a is fixed at a position facing the permanent magnet 5b. When wire harnesses (not illustrated) are connected, and then the covers 15 and 16 are coupled to the case 12 via an O-ring OR which is a sealing member using bolts, the space inside the case 12 is sealed. After the assembling is performed as described above, the ball joint JL is connected to a tip end of the rod 2, and a rubber boot BT is mounted on the tip end of the rod 2.

An aspect of this disclosure is directed to a rear wheel steering apparatus for a vehicle including: a housing that is connected via a first connecting member and a second connecting member to a suspension mechanism which supports rear wheels of a vehicle; an electric motor that is accommodated in the housing; a planetary gear mechanism that has a sun gear which is connected to an output shaft of the electric motor, a ring gear which is non-rotatably supported inside the housing, a planetary gear which meshes with the ring gear and the sun gear, and a carrier which is connected to the planetary gear, and reduces the output of the electric motor; and a linear motion mechanism that has a nut member which is connected to the planetary gear mechanism and forms the carrier, and a rod which is screwed to the nut member and is connected to the second connecting member, and converts the rotational motion of the nut member into the linear motion of the rod, in which the planetary gear mechanism includes a circular columnar pin that rotatably supports the planetary gear and is fixed to the nut member, and a locking member that is joined to a tip end portion of the pin and has at least one contact portion on a surface thereof facing the planetary gear, and in a state where the planetary gear is installed between the contact portion of the locking member and the nut member, the planetary gear is supported to be capable of rotating around the pin.

In the rear wheel steering apparatus, it is preferable that the locking member has a concave portion that supports the tip end portion of the pin, and a plurality of protruding ridges are provided on an inner circumferential surface of the concave portion while being equally spaced along a circumference around the pin, with the protruding ridges extending in an axial direction of the pin, and protruding in a direction toward the axis of the pin. It is also preferable that the locking member has a through hole that has a diameter smaller than the inner diameter of the concave portion, and passes through a bottom surface of the concave portion.

It is preferable that the contact portions of the locking member are radially provided around the pin while being equally spaced along the circumference around the pin. The contact portion may be provided in an annular manner around the pin. Alternatively, the contact portions may be formed of a plurality of protrusions which are provided in a protruding manner around the pin while being equally spaced along the circumference around the pin.

According to the aspect of this disclosure with the aforementioned configuration, the following effects can be obtained. That is, in the rear wheel steering apparatus according to the aspect of this disclosure, the planetary gear mechanism includes the circular columnar pin that rotatably supports the planetary gear and is fixed to the nut member, and the locking member that is joined to the tip end portion of the pin and has at least one contact portion on the surface thereof facing the planetary gear. In a state where the planetary gear is installed between the contact portion of the locking member and the nut member, the planetary gear is supported to be capable of rotating around the pin. Only the contact portions of the locking member can be in contact with the planetary gear such that a contact area between both the locking member and the planetary gear is considerably reduced, and thus the co-rotation of the locking member can be prevented. Accordingly, the planetary gear can be properly supported, and a state of support can be reliably maintained. A circular columnar metal pin for general use can be used, and the locking member can be easily made of synthetic resin, and thus cost can be reduced.

In the rear wheel steering apparatus, in a case where the locking member has the concave portion that supports the tip end portion of the pin, and the plurality of protruding ridges are provided on the inner circumferential surface of the concave portion while being equally spaced along the circumference around the pin, with the protruding ridges extending in the axial direction of the pin, and protruding in the direction toward the axis of the pin, when the locking member is locked to the pin, the pin is press-fitted into the concave portion of the locking member, and the plurality of protruding ridges equally apply press force to the pin. Accordingly, the pin can be properly supported. In a case wherein the locking member has the through hole that has a diameter smaller than the inner diameter of the concave portion, and passes through the bottom surface of the concave portion, when the pin is press-fitted into the concave portion of the locking member, the space between both the locking member and the pin communicates with the outside via the through hole, and thus, the locking member is capable of being easily locked to the pin.

It is possible to use the locking member including the contact portions which are radially provided around the pin while being equally spaced along the circumference around the pin, or to use the locking member in which the annular contact portion is provided around the pin. Alternatively, the contact portions can be formed of the plurality of protrusions which are provided in a protruding manner while being equally spaced along the circumference around the pin, and the contact portions can be properly set corresponding to a state of contact between the planetary gear of the planetary gear mechanism and the locking member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rear wheel steering apparatus for a vehicle comprising:
   a housing that is connected via a first connecting member and a second connecting member to a suspension mechanism which supports rear wheels of a vehicle;
   an electric motor that is accommodated in the housing;
   a planetary gear mechanism that has a sun gear which is connected to an output shaft of the electric motor, a ring gear which is non-rotatably supported inside the housing, a planetary gear which meshes with the ring gear and the sun gear, and a carrier which is connected to the planetary gear, and reduces the output of the electric motor; and
   a linear motion mechanism that has a nut member which is connected to the planetary gear mechanism and forms the carrier, and a rod which is screwed to the nut member and is connected to the second connecting member, and converts the rotational motion of the nut member into the linear motion of the rod,
   wherein the planetary gear mechanism includes
   a circular columnar pin that rotatably supports the planetary gear and is fixed to the nut member, and
   a locking member that is joined to a tip end portion of the pin and has at least one contact portion on a surface thereof facing the planetary gear, and
   wherein in a state where the planetary gear is installed between the contact portion of the locking member and the nut member, the planetary gear is supported to be capable of rotating around the pin,
   wherein the locking member has a concave portion that supports the tip end portion of the pin, and
   wherein a plurality of protruding ridges are provided on an inner circumferential surface of the concave portion while being equally spaced along a circumference around the pin, with the protruding ridges extending in an axial direction of the pin, and protruding in a direction toward the axis of the pin.

2. The rear wheel steering apparatus for a vehicle according to claim 1,
   wherein the locking member has a through hole that has a diameter smaller than the inner diameter of the concave portion, and passes through a bottom surface of the concave portion.

3. The rear wheel steering apparatus for a vehicle according to claim 1,
   wherein the contact portions of the locking member are radially provided around the pin while being equally spaced along the circumference around the pin.

4. The rear wheel steering apparatus for a vehicle according to claim 1,
   wherein the contact portion of the locking member is provided in an annular manner around the pin.

5. A rear wheel steering apparatus for a vehicle comprising:
   a housing that is connected via a first connecting member and a second connecting member to a suspension mechanism which supports rear wheels of a vehicle;
   an electric motor that is accommodated in the housing;
   a planetary gear mechanism that has a sun gear which is connected to an output shaft of the electric motor, a ring gear which is non-rotatably supported inside the housing, a planetary gear which meshes with the ring gear and the sun gear, and a carrier which is connected to the planetary gear, and reduces the output of the electric motor; and a linear motion mechanism that has a nut member which is connected to the planetary gear mechanism and forms the carrier, and a rod which is screwed to the nut member and is connected to the second connecting member, and converts the rotational motion of the nut member into the linear motion of the rod, wherein the planetary gear mechanism includes
- a circular columnar pin that rotatably supports the planetary gear and is fixed to the nut member, and
- a locking member that is joined to a tip end portion of the pin and has at least one contact portion on a surface thereof facing the planetary gear, and wherein in a state where the planetary gear is installed between the contact portion of the locking member and the nut member, the planetary gear is supported to be capable of rotating around the pin, wherein the contact portions of the locking member are formed of a plurality of protrusions which are provided in a protruding manner around the pin while being equally spaced along a circumference around the pin.

* * * * *